United States Patent [19]
York

[11] Patent Number: 5,833,260
[45] Date of Patent: Nov. 10, 1998

[54] MOBILE MOTOR VEHICLE SERVICE UNIT WITH SELF-CONTAINED ELEVATING SUPPORT LEGS AND RAMP

[76] Inventor: George Thomas York, 17620 -50th St. E., Sumner, Wash. 98390

[21] Appl. No.: 605,277

[22] Filed: Feb. 7, 1996

Related U.S. Application Data

[63] Continuation-in-part of Ser. No. 191,100, Feb. 4, 1994, abandoned.
[51] Int. Cl.$^6$ ............................................. B60S 9/02
[52] U.S. Cl. ..................... 280/475; 280/764.1; 280/789
[58] Field of Search ............................ 414/537; 280/475, 280/763.1, 764.1, 656, 789; 254/88, 89 R

[56] References Cited

U.S. PATENT DOCUMENTS

| | | | |
|---|---|---|---|
| 3,294,367 | 12/1966 | Liskey | 254/88 |
| 3,834,565 | 9/1974 | Goodman, Jr. et al. | 414/537 |
| 4,445,665 | 5/1984 | Cray | 254/88 |
| 4,824,133 | 4/1989 | Wilson | 280/475 X |

FOREIGN PATENT DOCUMENTS 2545427 9/1984 France .
2249759 5/1992 United Kingdom .

*Primary Examiner*—Peter M. Poon
*Attorney, Agent, or Firm*—David L. Tingey

[57] ABSTRACT

A trailerable, mobile motor vehicle service unit is especially equipped to realign wheels and axles of a motor vehicle driven onto the unit. The unit provides a track on which a motor vehicle is driven and a track ramp portion that can be lowered to the ground to facilitate loading of a motor vehicle. Once loaded the ramp is once again raised to a horizontal position. The unit is lifted from its wheels by 4 fixed-length support legs positioned under the wheel position of the loaded motor vehicle which pivot by action of hydraulic cylinders which draw the respective legs to or extend them from the unit. The unit may also be lowered to the ground by first hydraulically relocating its wheels mounted on a slidable axle frame into a wheel storage area of the unit body frame before lowering the unit on its support legs. The unit also is provided with a longitudinally relocatable hoist mounted between track 16 and 16' and with transversely-adjustable primary and secondary wheel alignment pads, respectively located forward in the tracks and over the forward support legs in the normal position of the motor vehicle front wheels and on extension braces forward of the tracks to accommodate long vehicles.

22 Claims, 17 Drawing Sheets

MOBILE MOTOR VEHICLE SERVICE UNIT WITH SELF-CONTAINED ELEVATING SUPPORT LEGS AND RAMP

This is a continuation-in-part of Ser. No. 08/191,100, filed in the U.S. Feb. 4, 1994, now abandoned.

BACKGROUND OF THE INVENTION

The present invention relates generally to trailers that support motor vehicles and, more specifically, to such a trailer with elevating support legs and a lowerable ramp and equipped to perform maintenance services on the motor vehicle, such as wheel alignment.

It is known in the art to have various trailers for carrying motor vehicles. It is also known to have a trailer with elevating legs. U.S. Pat. No. 4,940,110, for example, describes a trailer with hydraulically influenced elevating legs with wheels mounted on outrigger elevating legs external of the trailer with a link mechanism that retracts the trailer wheels to the legs when the legs are extended to lift the trailer.

It is not previously known to have a mobile motor vehicle service unit with elevating legs under the trailer that raises the unit with a motor vehicle loaded thereon, together with a vehicle load ramp pivotably attached to the unit that lowers to the ground at its distal end. It is also not previously known to have such a trailer unit that can itself be lowered to the ground.

SUMMARY OF THE INVENTION

It is therefore an object of the present invention to provide a mobile motor vehicle servicing unit trailerable from site to site. It is a further object to provide therein the capability to raise the unit off of its wheels through 4 support legs for stability of the unit and ease in servicing the motor vehicle supported thereon. Further, it is an object that the trailer track include a ramp portion rearward of the unit that is mounted pivotably to the unit and lowers to the ground on its distal end to facilitate a motor vehicle driving on the ramp and forward on the track. It is another advantage to provide a wheel alignment pad in the forward end of the track and means for bending axles for realigning the motor vehicle wheels. It is yet another object to provide in the unit a capability to lower the unit to the ground to accommodate long motor vehicles, such as motor homes, that would not fit on the unit track. Finally, it is an object that the trailer have a hoist integral therein able to lift the motor vehicle from the unit track on which the motor vehicle wheels run on the top surface of the unit.

The present invention meets its objectives in describing a mobile motor vehicle service unit especially equipped to realign wheels and axles of a motor vehicle driven onto the unit. The trailerable unit may be lifted from its wheels and supported by 4 support legs by action of coordinated hydraulic cylinders at each leg. The unit provides a track on which a motor vehicle is driven and a track ramp portion that can be lowered to the ground to facilitate loading of the motor vehicle. Once loaded the ramp is once again raised to a horizontal position. The support legs are positioned on the unit under the wheel position of the loaded motor vehicle, thereby providing direct support of the vehicle load from its wheels to the ground.

The fixed-length support legs pivot at the unit body frame by action of a hydraulic cylinder pivotably mounted between a leg and the body frame, intermediate the length of the leg and forward of the forward support leg pivoting mount to the body frame and rearward of the rearward support leg pivoting mount to the body frame. Thus, when the hydraulic cylinder extends, the leg is pushed downward, and when it retracts, the leg is drawn upward toward the unit body frame on a projected line longitudinal with the unit. The rear support legs are provided with wheels that contact the ground; the front support legs are provided with a ground contact pad pivotably attached to the legs. Thus, as the unit is raised or lowered, and the footprint of the 4 legs on the ground changes, the front legs remain in position and the rear legs relocate.

The unit may also be lowered to the ground on its support legs to accommodate vehicles too long to fit on the unit track. To do so, the unit wheels must be relocated into a wheel storage area of the unit body frame. The wheels are therefore mounted on a slidable wheel axle frame positioned under the unit body frame. When the unit is being transported, the wheels and axle frame are in a locked rearward position. When the wheels are unloaded and the unit is supported by the 4 support legs, the axle frame may be relocated forward with the assistance of a hydraulic cylinder mounted between the axle frame and the body frame.

The unit also is provided with a hoist mounted between the tracks and relocatable along the tracks anywhere under the motor vehicle so that the vehicle, or an end of the vehicle, can be raised off of the track, for example, for servicing of the wheels.

The unit is also provided with primary and secondary wheel alignment pads. The primary pads are located forward in the tracks and over the forward support legs in the normal position of the motor vehicle front wheels. The secondary alignment pads are located on extension braces forward of the tracks to accommodate long vehicles. All pads are adjustable transversely in the tracks to match different vehicle wheel tracks.

To assist in leveling the trailer, a gyro leveling sensor is provided central to the unit, with data transmitted to a display. The trailer is then leveled manually by initiating hydraulic pressure or release of pressure to one of the leg support hydraulic cylinders, causing the leg to extend from or draw to the unit body frame. Control of hydraulic pressure is through an assembly of electrically-actuated hydraulic valves.

DESCRIPTION OF THE PREFERRED EMBODIMENTS

Figure 1:
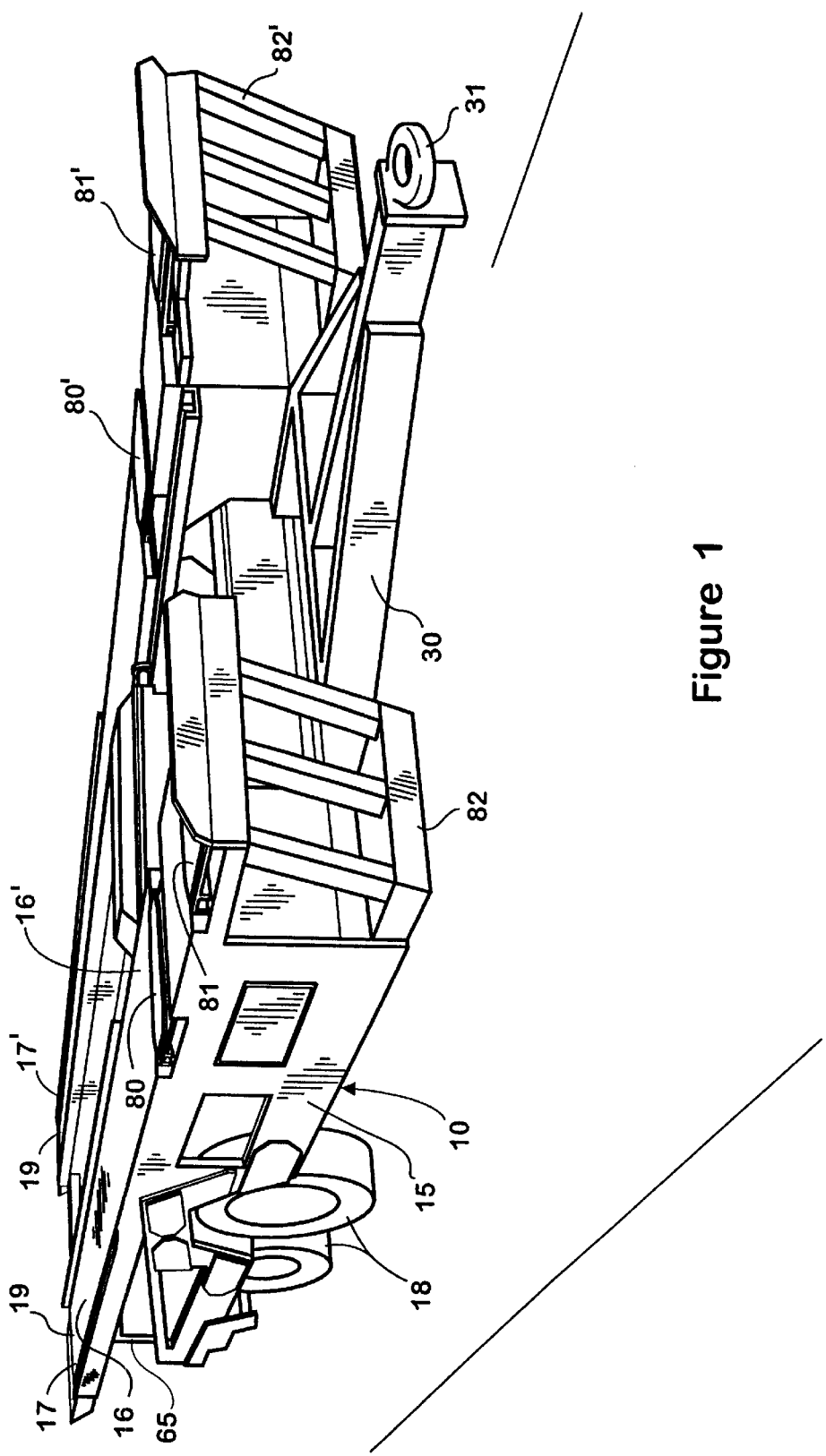
FIG. 1 is a front perspective view of the mobile motor vehicle service unit.
Figure 2:
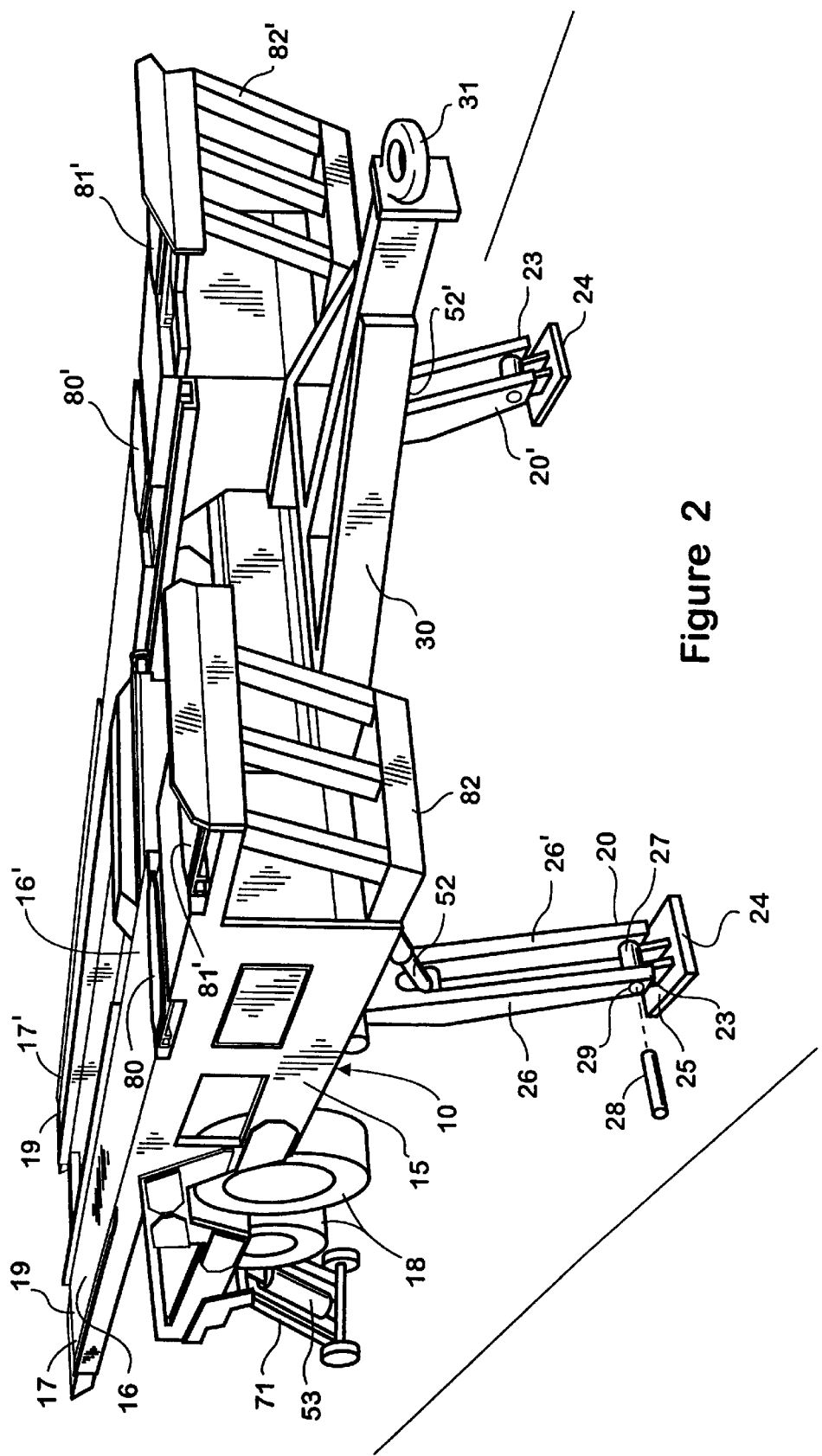
FIG. 2 is a front perspective view of the unit shown raised off of its wheels on supporting legs.
Figure 3:
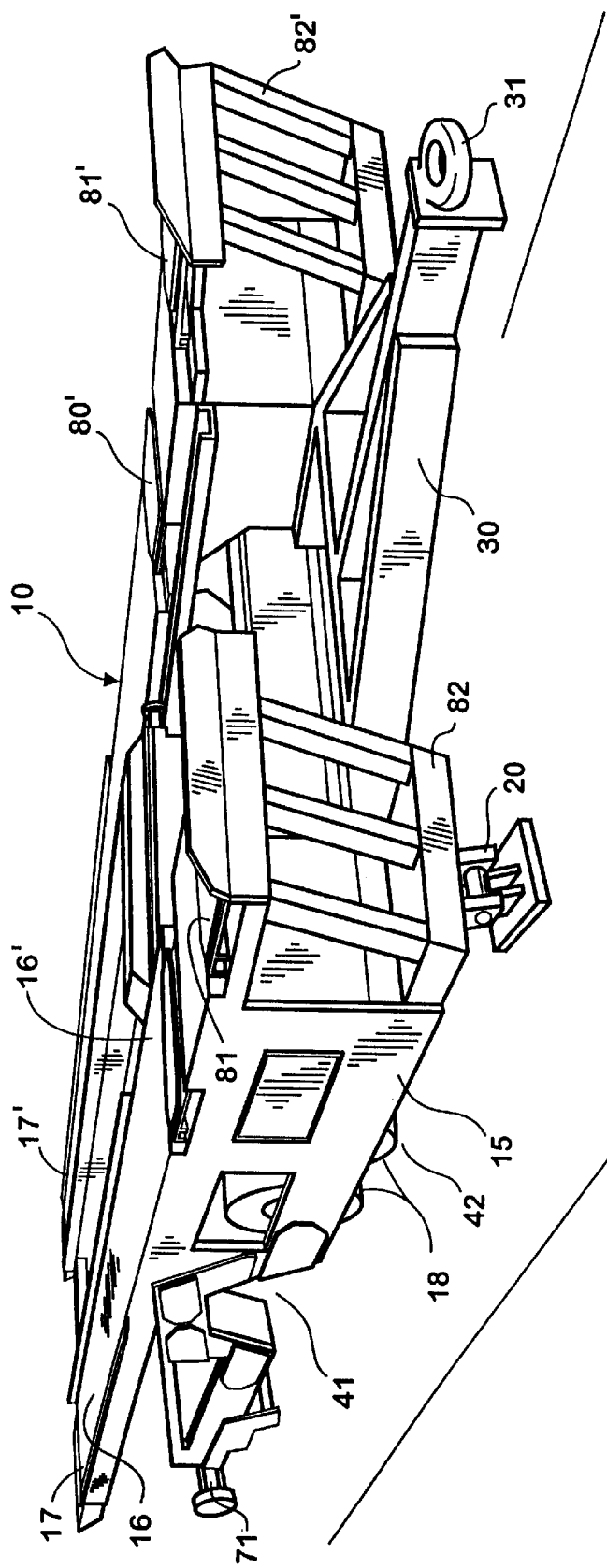
FIG. 3 is a front perspective view of the unit shown lowered to the ground.
Figure 4:
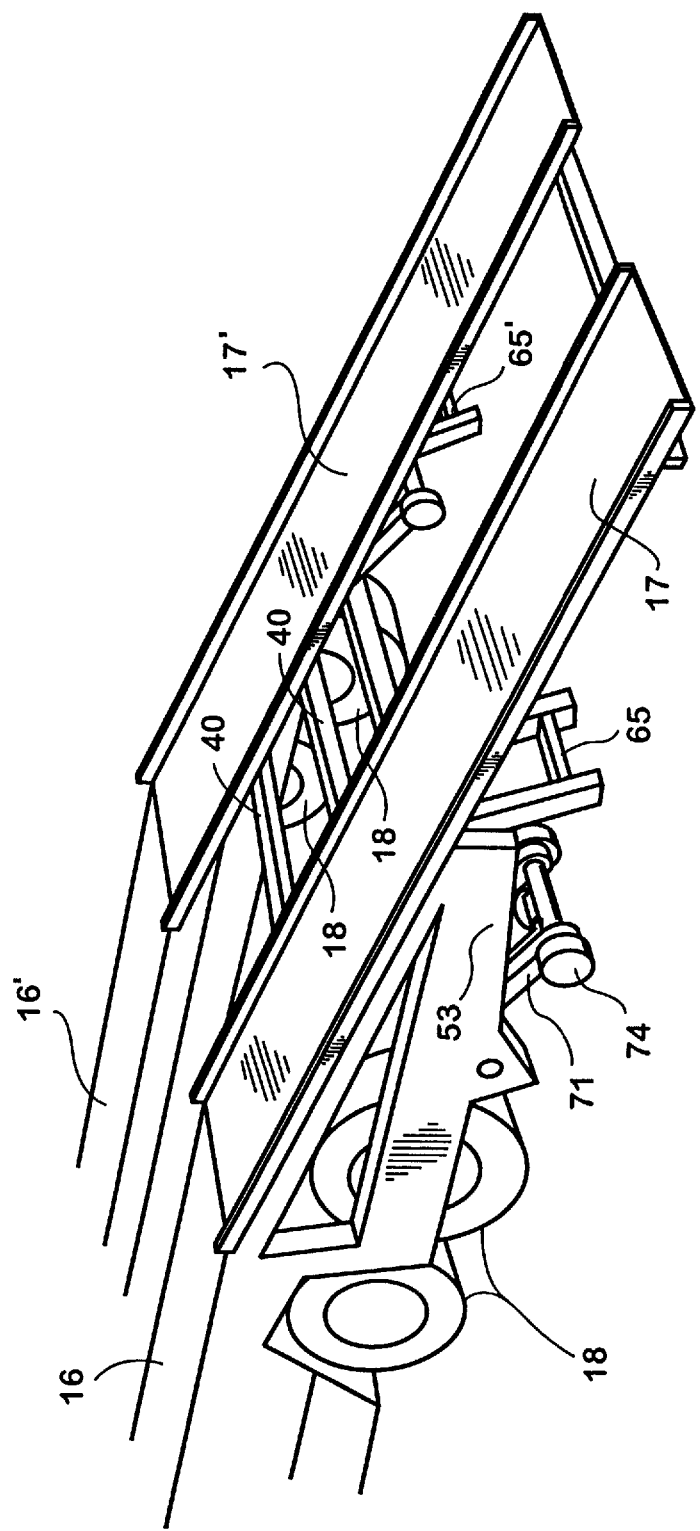
FIG. 4 is a partial rear perspective view of the unit showing the track ramp lowered from the track to the ground.
Figure 5:
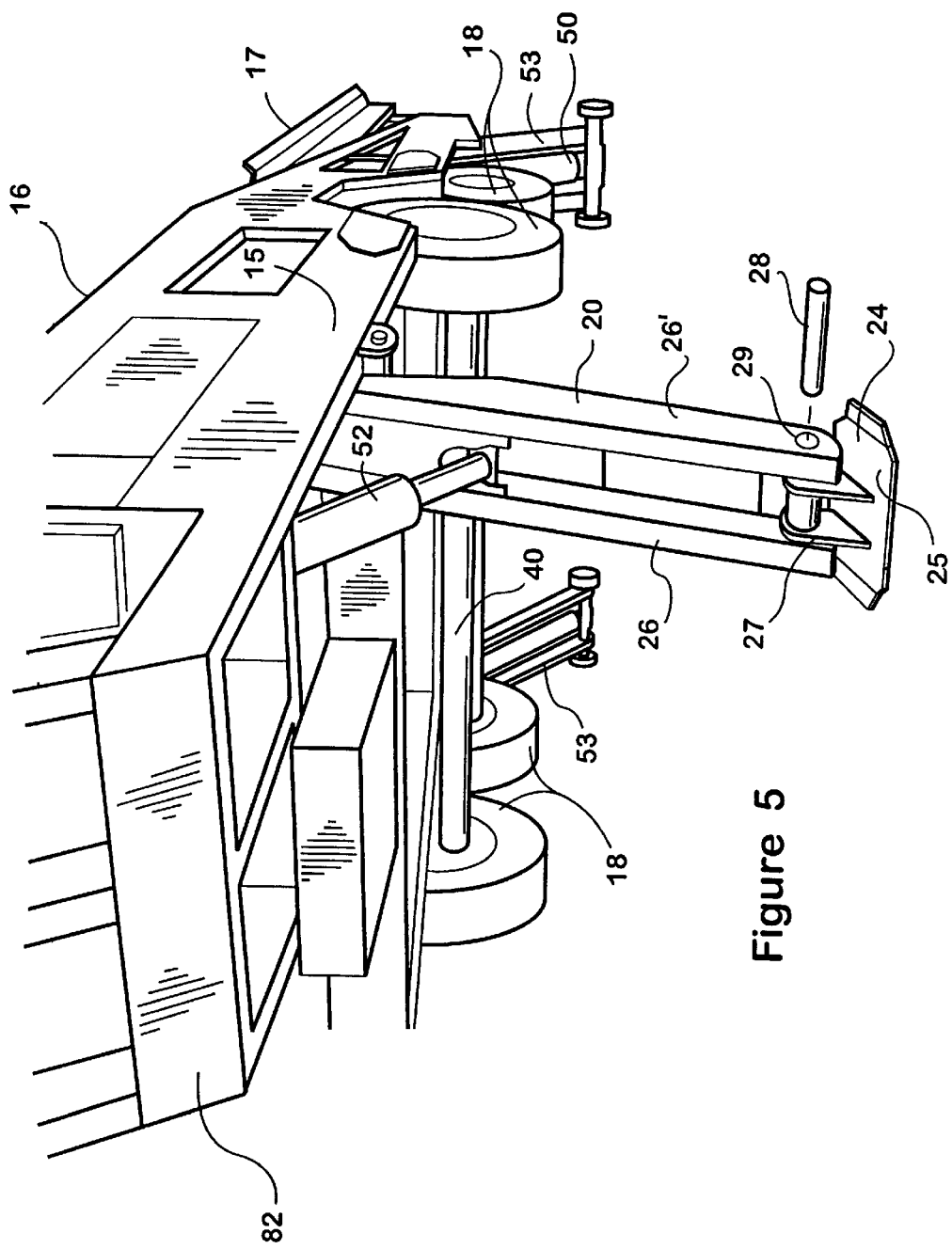
FIG. 5 is a partial front view of the unit underside showing a pivotably-mounted front support leg with pivoting foot extended by action of a hydraulic cylinder pivotably-mounted intermediate the leg.
Figure 6:
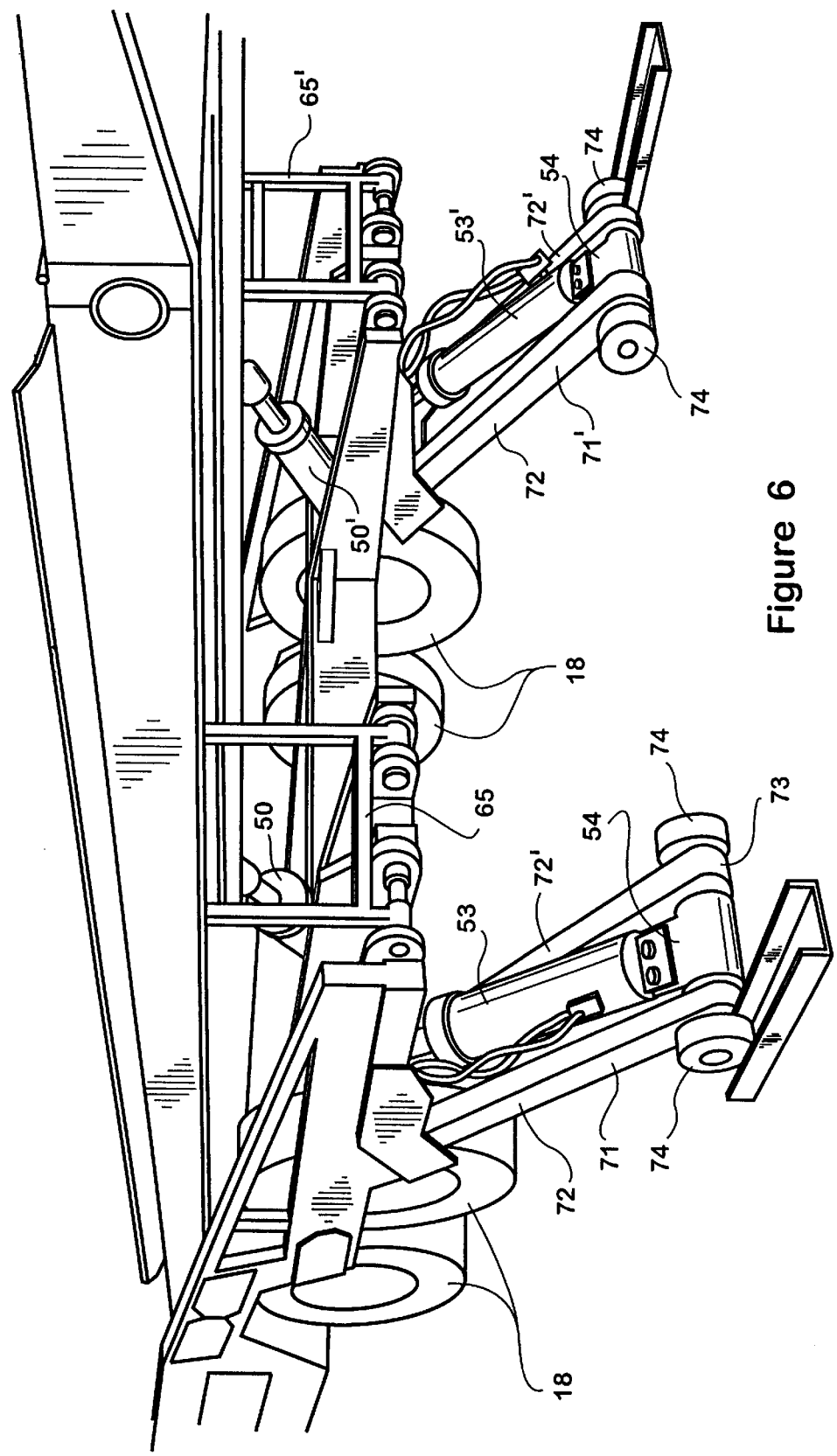
FIG. 6 is partial rear perspective view of the unit showing both rear supporting legs pivotably mounted to the unit and with wheels mounted on their distal end to allow the rear legs to relocate as the trailer unit is raised or lowered under action of a pivotably-mounted hydraulic cylinder, also shown.
Figure 7:
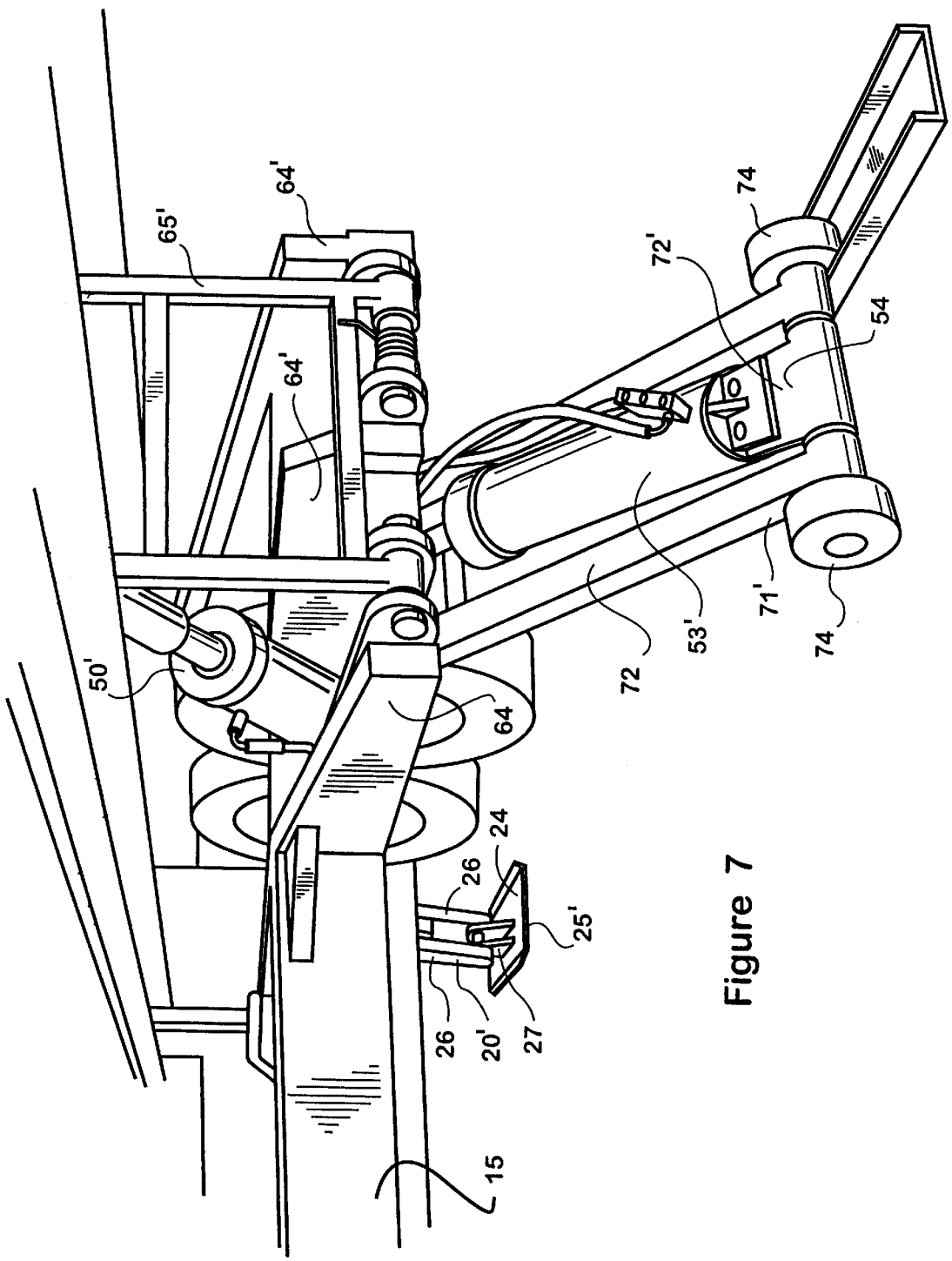
FIG. 7 is a partial rear perspective view of the unit showing the side-by-side relation of a hydraulic cylinder for controlling the track ramp and the hydraulic cylinder for exercising the rear support leg.
Figure 8:
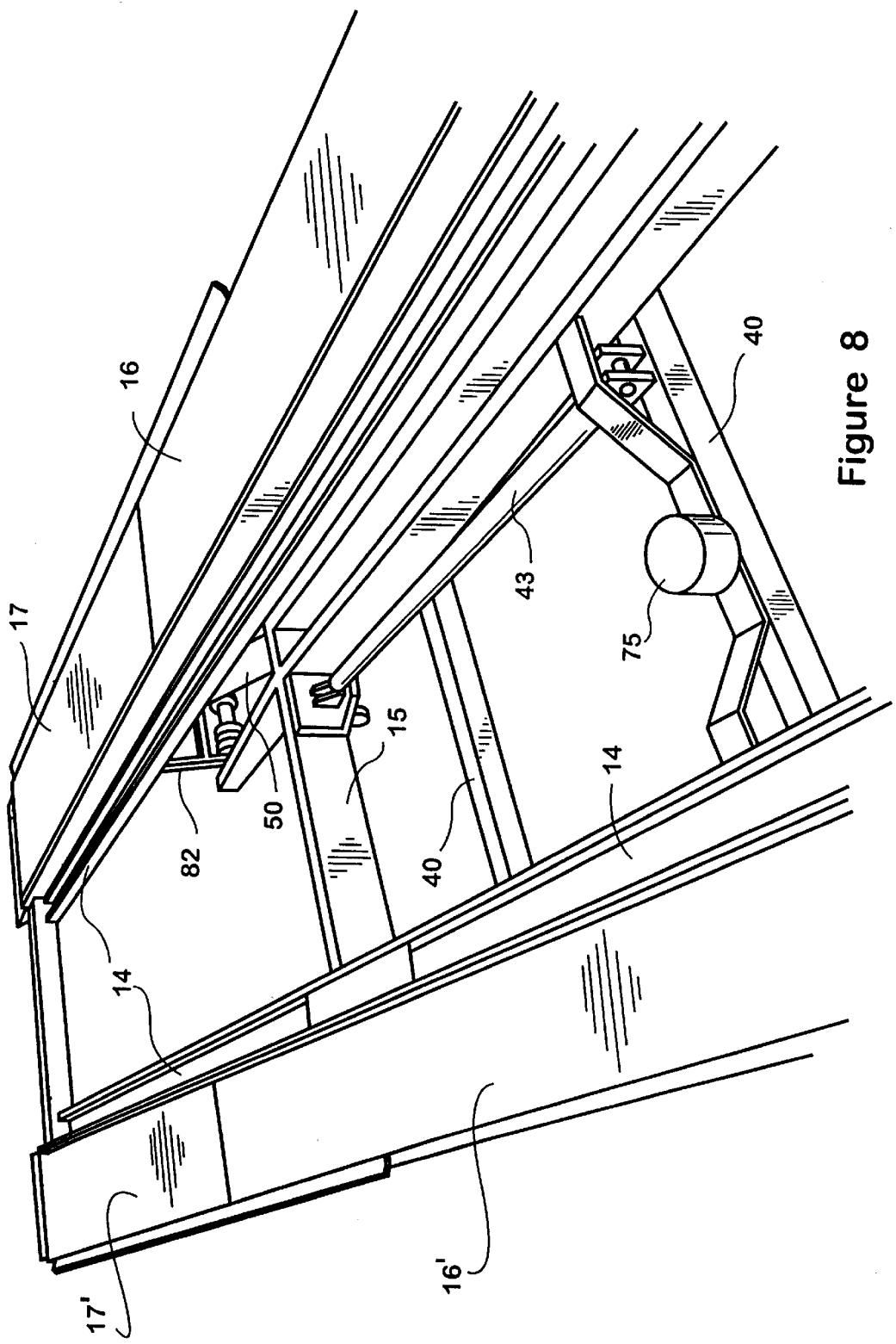
FIG. 8 is a partial rearward perspective view of the top of the unit showing the gyro sensing unit and the rearward portion of the track and relocatable wheel axles actuated by a hydraulic cylinder.
Figure 9:
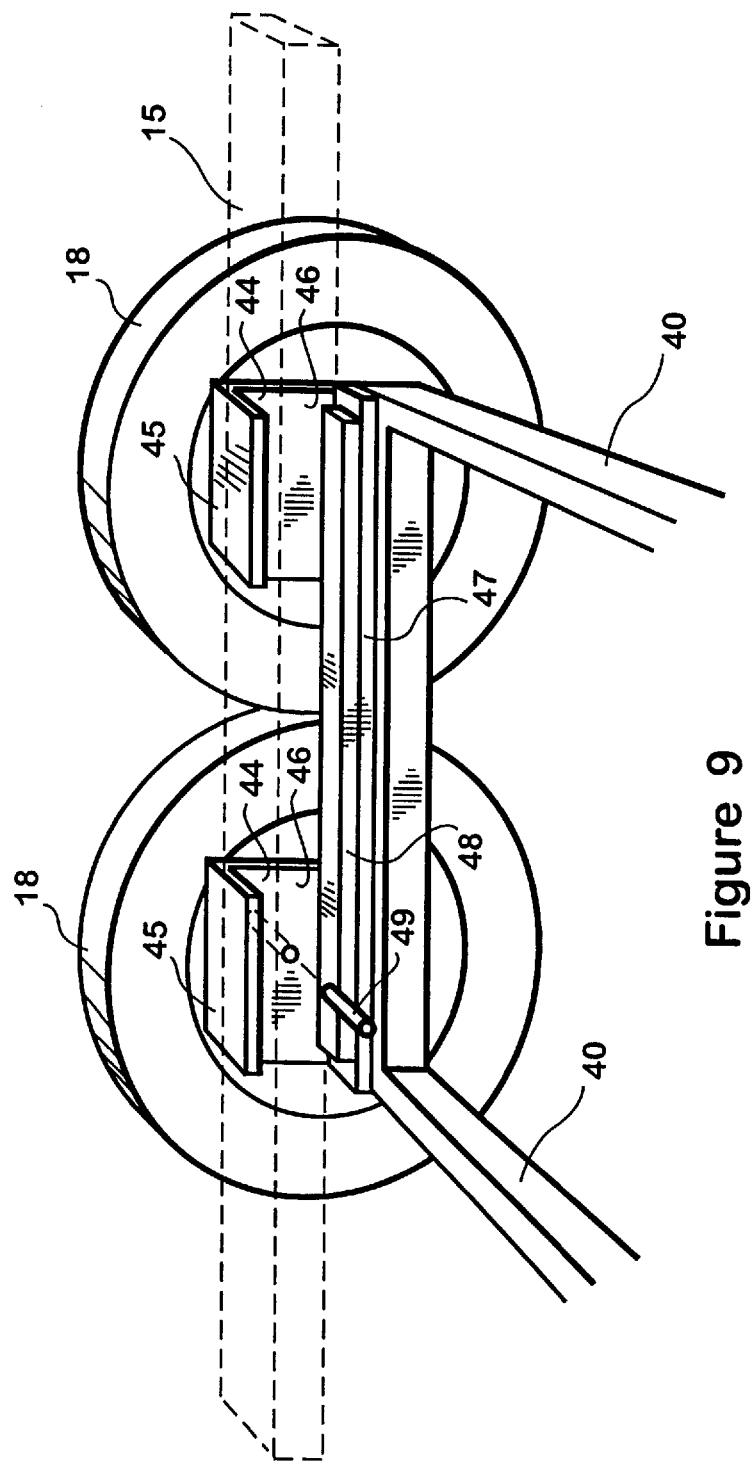
FIG. 9 is a view of the axle frame connected below the unit body frame by support bars.
Figure 10:
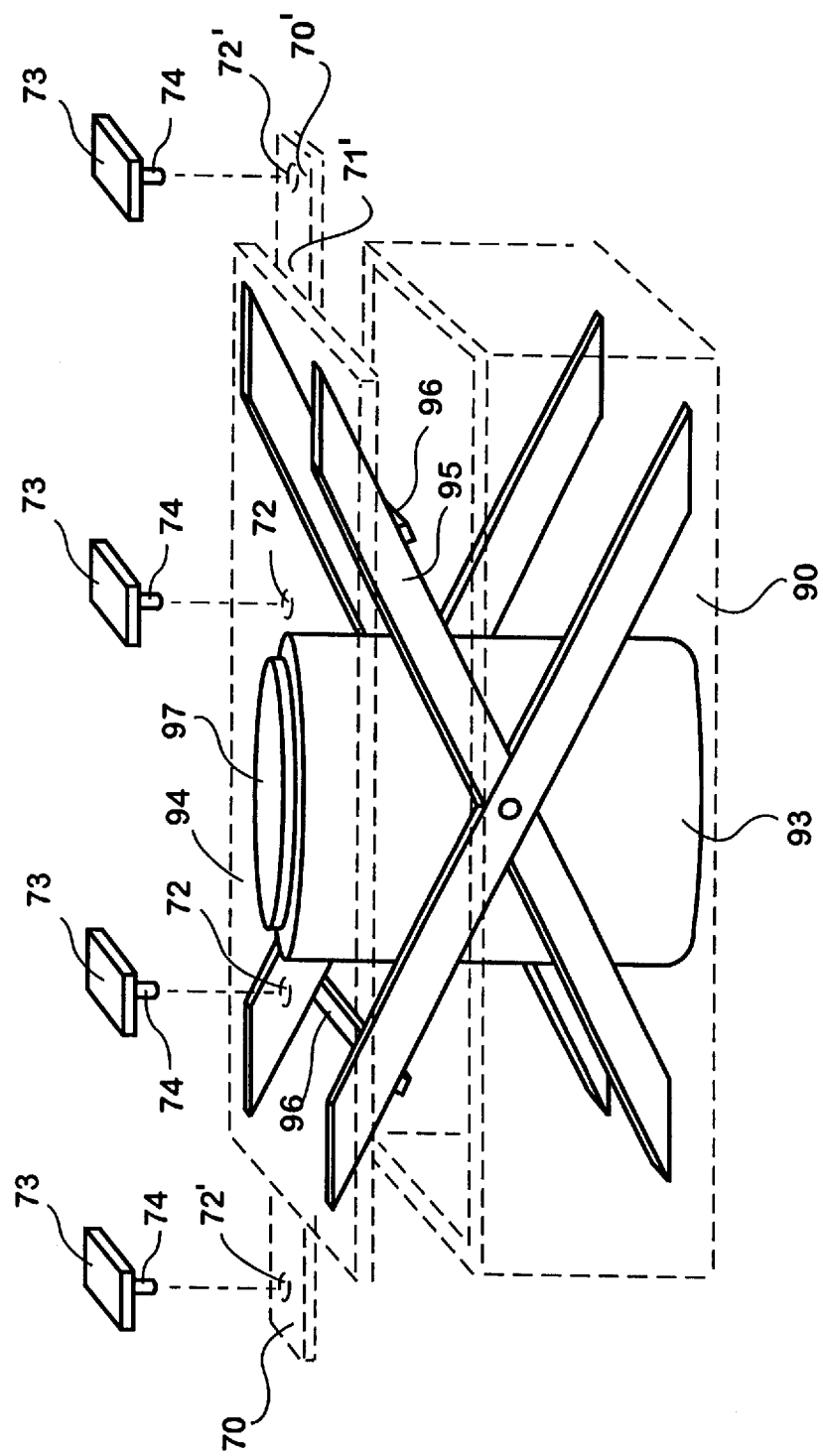
FIG. 10 is a cut-away perspective view of the hoist showing its compressed air bladder and scissor support braces.
Figure 11:
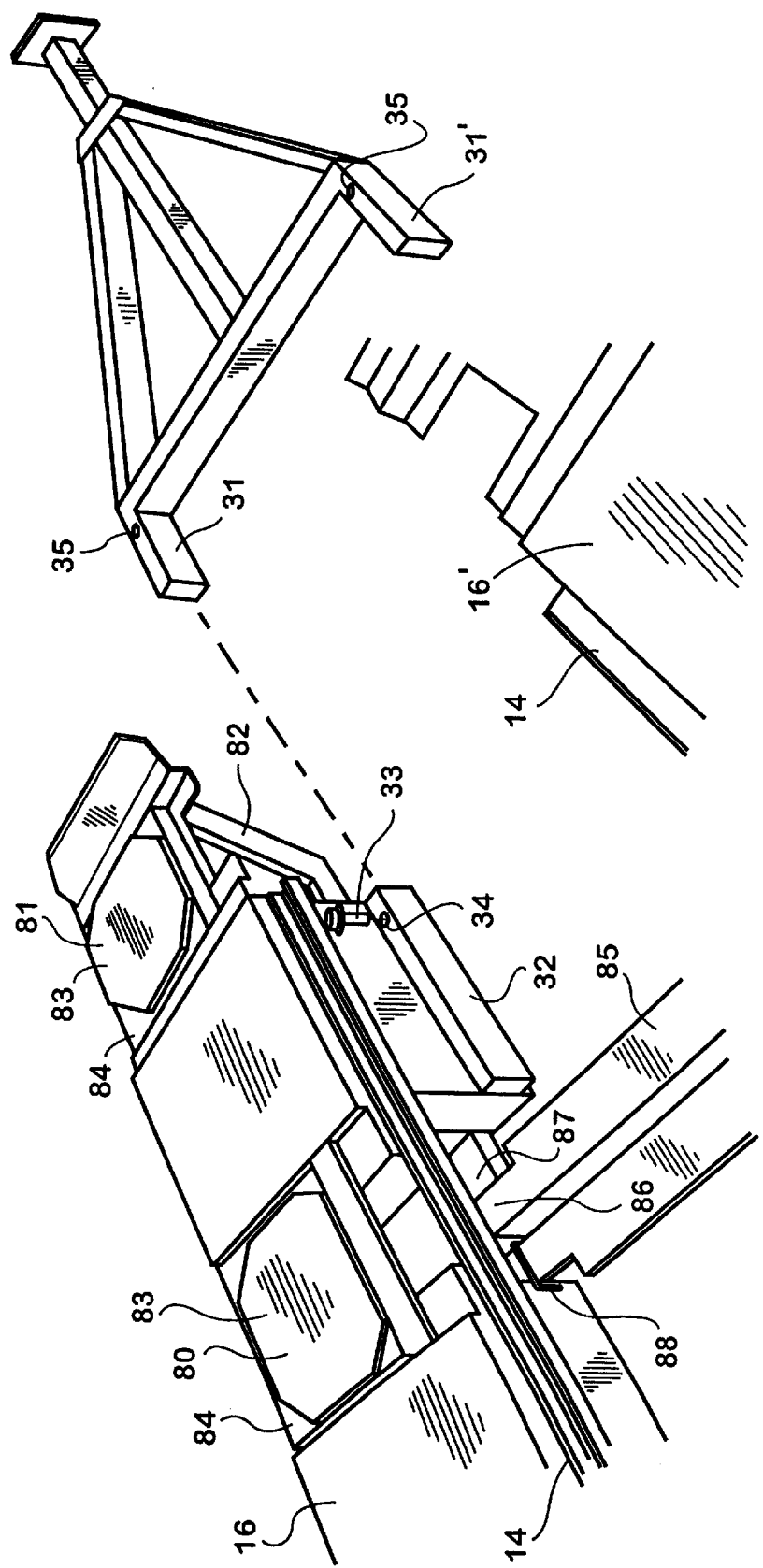
FIG. 11 is a partial perspective view of the removable trailer tongue frame and left track alignment pads.
Figure 12:
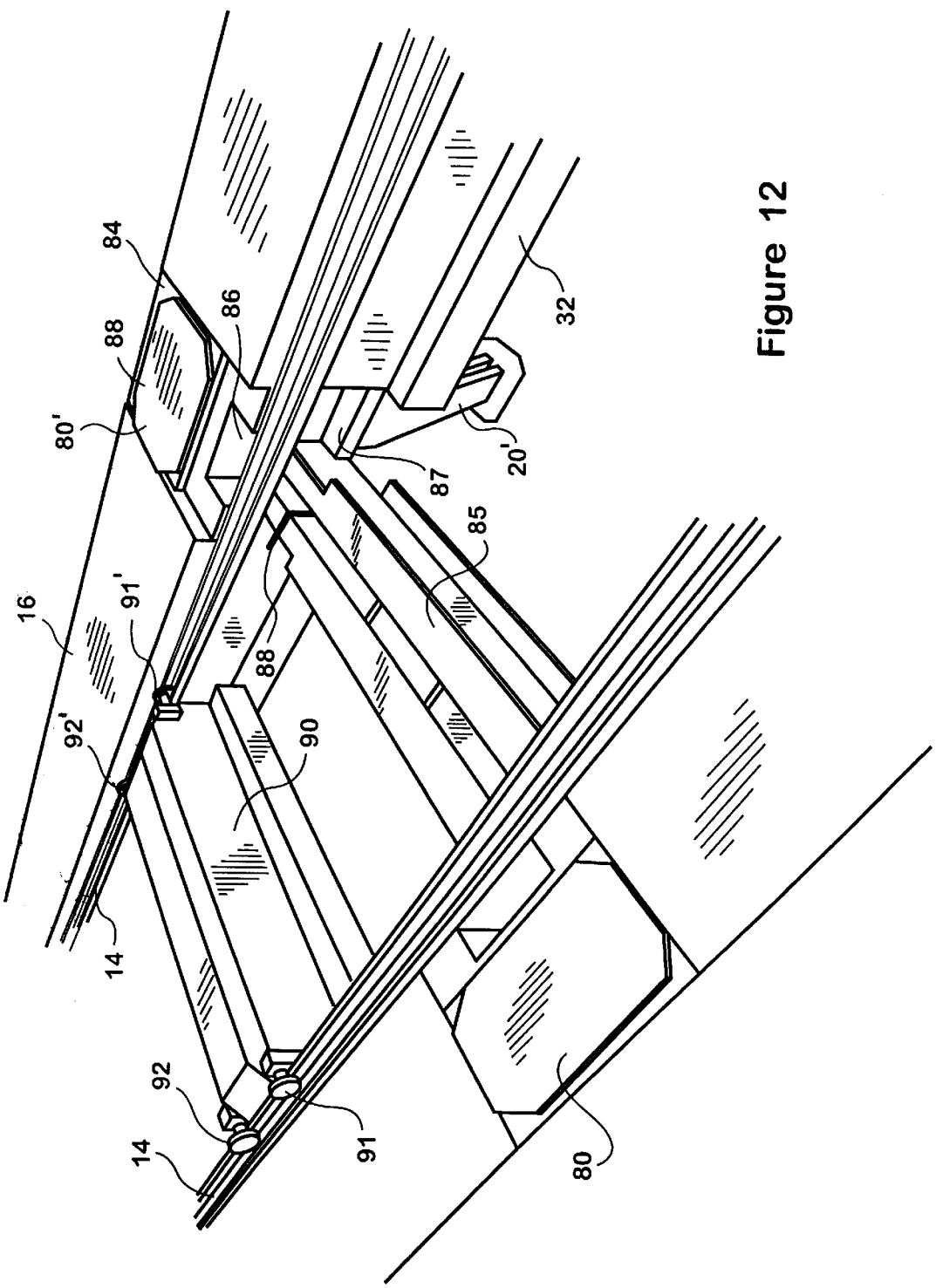
FIG. 12 is a partial perspective view of a transverse beam on which ancillary axle bending apparatus may be attached, also showing the hoist, primary alignment pads, and left front support leg below an alignment pad.
Figure 13:
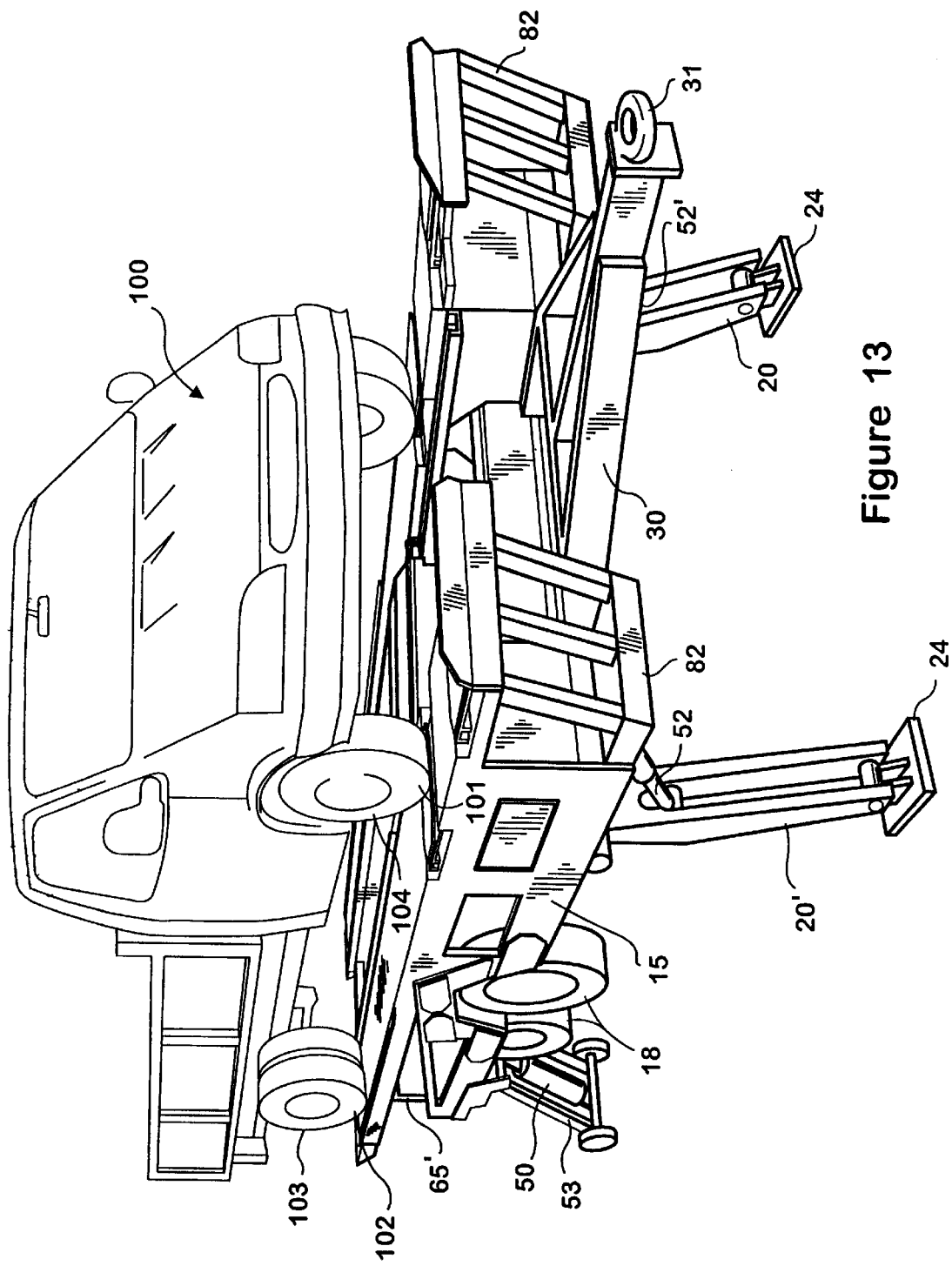
FIG. 13 is a perspective view of the unit showing a motor vehicle on the unit with its wheels above the support legs.
Figure 14:
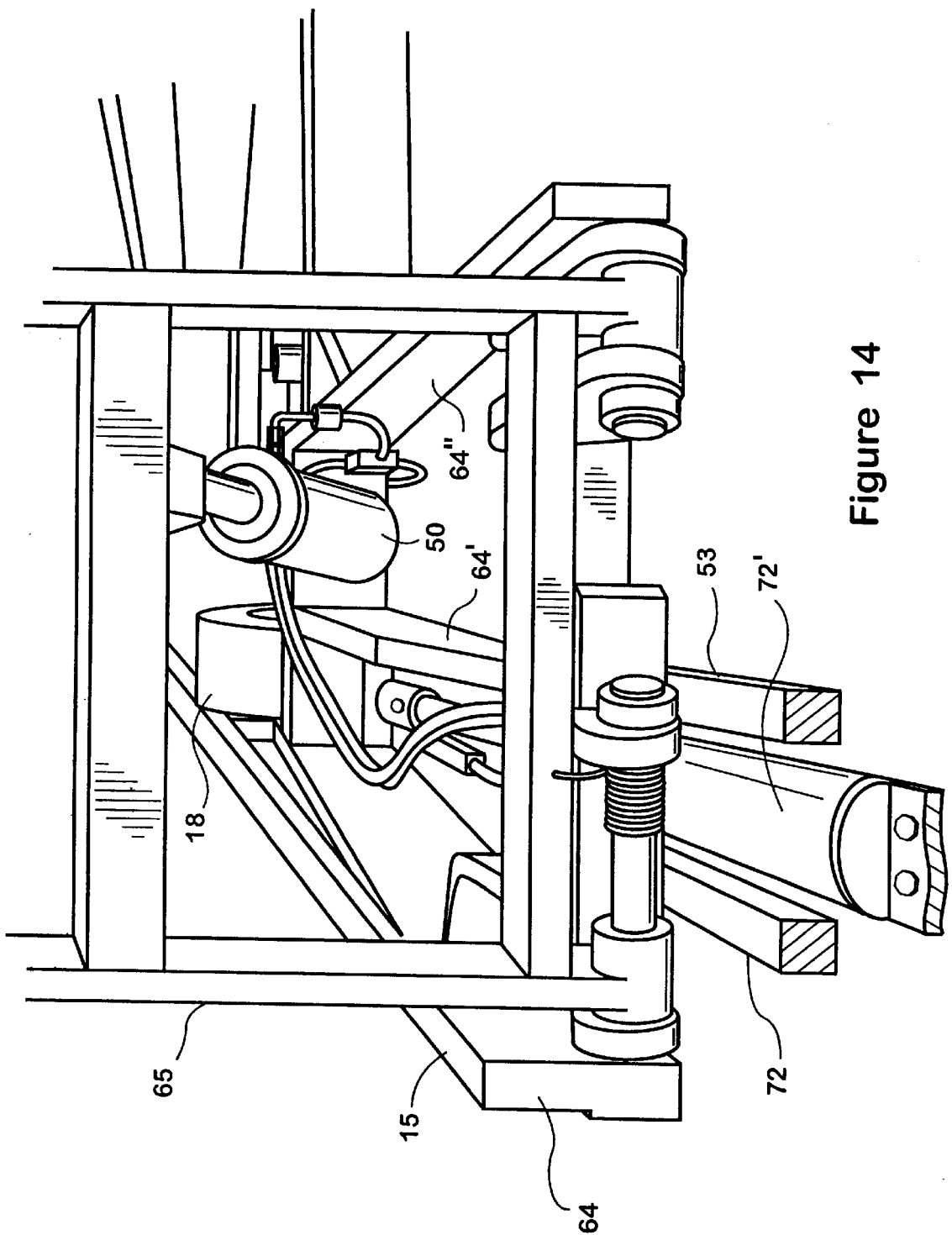
FIG. 14 is a perspective view of the cylinder mounting area showing the track ramp cylinder and rear supporting leg cylinder pivotably mounted to the forked body frame.
Figure 15:
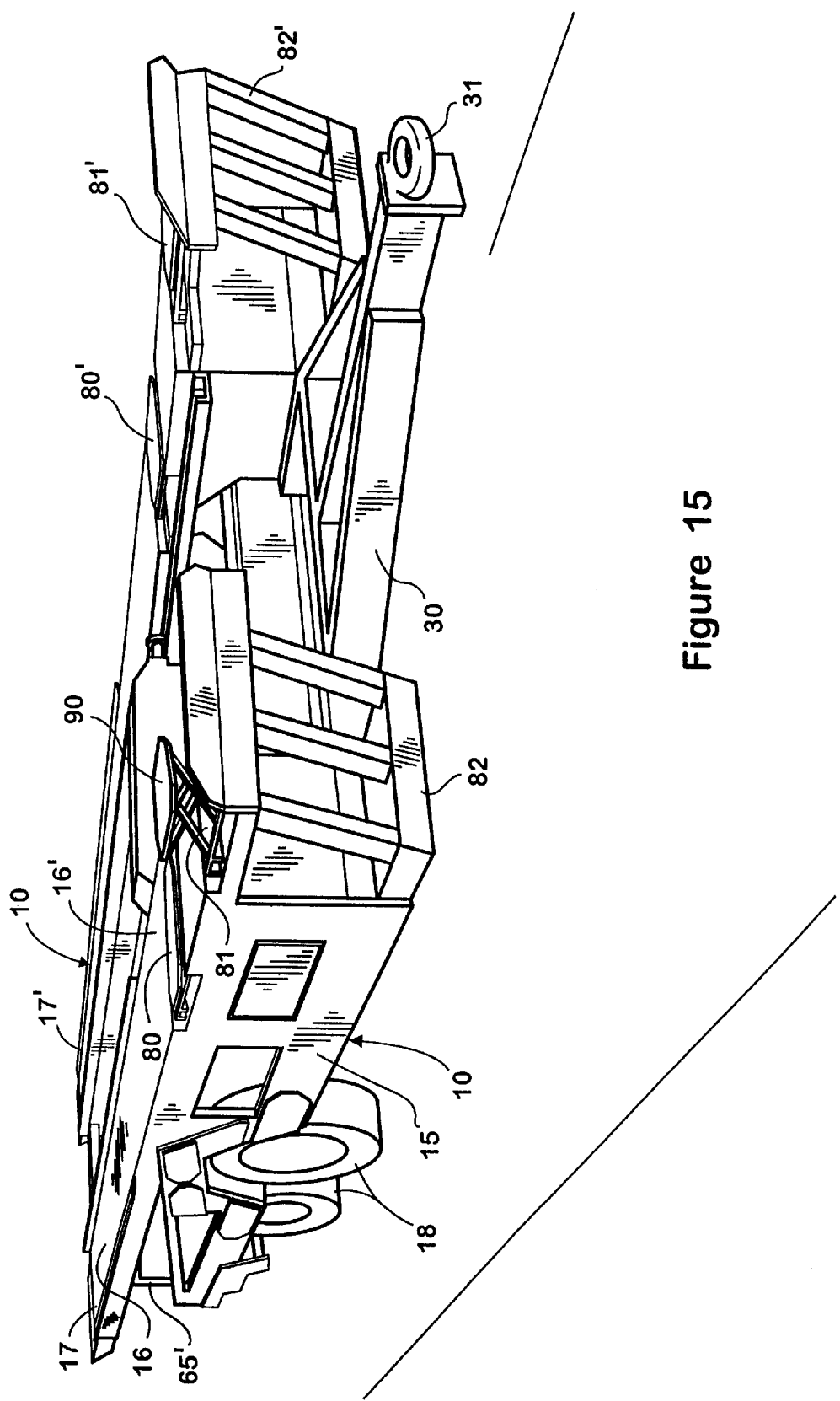
FIG. 15 is a perspective view of the unit showing the unit hoist extended.
Figure 16:
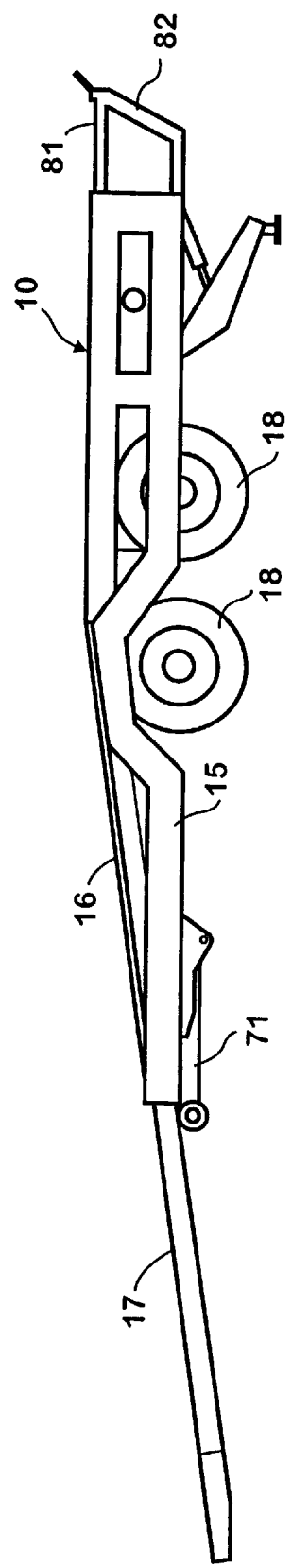
FIG. 16 is a side view of the unit shown with the ramp lowered to the ground.
Figure 17:
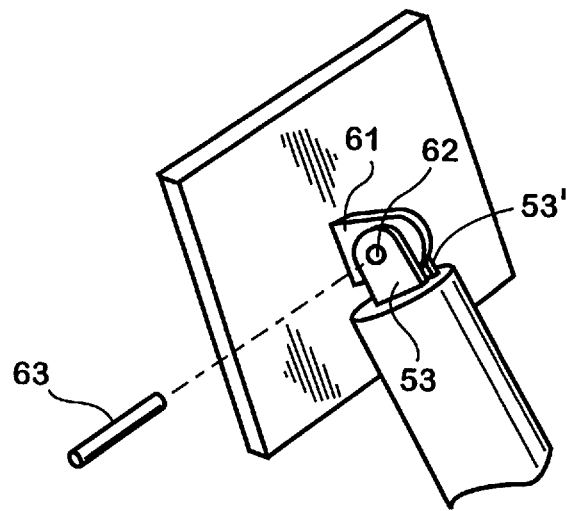
FIG. 17 is a perspective view of the means of pivotal attachment of the forward support leg hydraulic cylinders and the rearward ramp support cylinders to the body frame.
Figure 18:
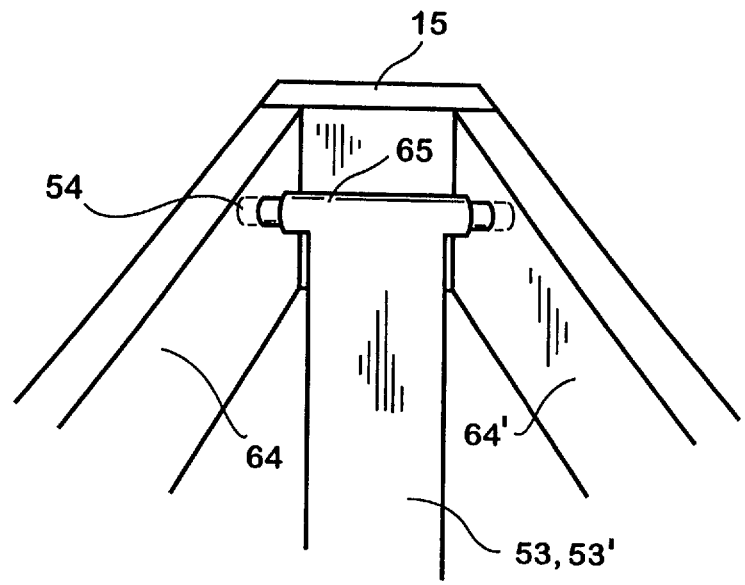
FIG. 18 is a perspective view of the means of pivotal attachment of the rearward support leg hydraulic cylinders.

Referring to the Figures, the mobile motor vehicle service unit 10 of this invention includes a body frame 15 on the top of which a left and a right track 16 and 16' are secured on which a motor vehicle 100 may be driven, four support legs 20, 20' and 71, 71', a removable trailer tongue frame 30 extending forward from the body frame 10 and having means 31 for attaching the tongue frame 30 to a trailer hitch, and an axle frame 40 to which wheels 18 are rotatably attached.

The trailer tongue frame 30 comprises two rearward extending attachment beams 31 and 31' sized to fit respectively in sleeves 32 mounted on each side of the unit body frame 15, inward of the tracks 16 and 16', held in position by a retention pin 33 fitting through a hole 34 on each sleeve and an aligned corresponding hole 35 on each attachment beam 31, 31'.

Each track 16, 16' has a corresponding track ramp 17, 17' rearward of the track 16 mounted pivotably to the body frame 15. Track ramp hydraulic cylinders 50, 50' are pivotably attached intermediate the track ramps 17, 17' respectively to raise and lower the ramp distal ends 19, 19' from horizontal to the ground.

The four support legs, two forward 20 and 20' and two rearward 71 and 71', are fixed in length and are pivotably attached to the body frame 15, each actuated by support leg hydraulic cylinders 52, 52' and 53, 53', respectively, pivotably mounted between a leg and the body frame 15 intermediate the length of the leg and forward of a forward support leg pivoting mount to the body frame 15 and rearward of a rearward support leg pivoting mount to the body frame 15. The forward support legs 20, 20' are mounted to the body frame 15 under the normal front tire position 101 of a motor vehicle 100 as typically parked on the tracks 16, 16' provide direct support of the vehicle load point (wheel contact with track) through the body frame 15 to the ground, minimizing strain and torque stress on the body frame 15.

The forward hydraulic cylinders 52, 52' and the rearward track ramp hydraulic cylinders 50, 50' are pivotably attached to the body frame 15 by means of a body frame plate 61 extending from the body frame 15 and having a hole therethrough. The connecting end of each hydraulic cylinder has a pair of parallel plates 53, 53' extending from the end of the cylinder in an spaced-apart relationship each with a hole 62 in alignment with and matching in size the hole of the body frame plate 61. A connecting pin 63 passes through the holes 62 in alignment, allowing the cylinder plates 53, 53' to pivot on the connecting pin 62 about the body frame plate 61.

On the distal end 23 of each forward support leg 20, 20' is a foot 24 pivotably mounted to maintain full contact with the ground at all positions of the leg 20, 20'. In the preferred embodiment, the leg divides into 2 support arms 26, 26' between which is pivotably mounted a plate 27. A rod 28 passes through a hole in the plate and into holes 29 in each support arm. A foot pad 25 is attached to the plate 27 for engagement with the ground.

Each rearward leg hydraulic cylinder 53, 53' is mounted on the body frame 15 side-by-side the track ramp hydraulic cylinder 50, 50'. At a point of attachment, the body frame 15 forks into 3 parallel beams 64, 64', 64" dividing the frame into 2 adjacent cylinder mount areas in which are mounted the track ramp 17 cylinder and the rearward support leg cylinder, respectively. Both cylinders are mounted forward in the mount areas at approximately the same longitudinal frame position to focus motor vehicle load from the track 16 load cylinder to the leg cylinder at the same frame position to minimize body frame 15 torque stress, while cooperating in positioning the ramps 17, 17' from the ground to a horizontal position with the trailer unit 10 raised off of the ground.

The rearward hydraulic cylinders 53, 53' are pivotably attached to the body frame 15 by means of a shaft 54 attached between two forks 64, 64' of the body frame 15 over which is a rotatable cylinder 65 to which a connecting end of the hydraulic cylinder is attached.

In similar manner to the forward support legs 20, 20', the rear support legs 71, 71' are mounted to the body frame 15 under an approximate rear tire position 102 of a motor vehicle 100 on the tracks 16, 16'. In fact, the portion of the track 16, 16' supporting rear wheels 103 of motor vehicle 100 is the track ramp 17, 17' raised to horizontal by ramp hydraulic cylinder 50, 50' mounted between the body frame 15 and each track ramp 17, 17', similarly passing the vehicle load in the most direct manner from the tracks 16, 16', through the ramp support cylinders 50, 50' and the rearward leg supports 71, 71' to the ground.

Each rearward support leg 71, 71' comprises left and right arms, 72, 72' which attach to a support leg axle 73 near each axle end; leg axle wheels 74 are rotatably attached to each end of the axle 73 in normal wheel and axle fashion. On each rearward support leg 71, 71' between the leg arms 72, 72', a first end 54 of a rearward leg hydraulic cylinder 53 is mounted to the axle 73 such that the legs can relocate by rolling on the wheels 74 when the leg is lifted and lowered. Thus, when the trailer unit 10 is raised, for example, the front support legs remain in position on the ground pivoting on the feet while the rear support legs 71, 71' roll forward on the leg wheels 74.

At the end of the forks 64, 64', 64" of the body frame 10 is a ramp support brace 65 and 65' corresponding to each ramp 17, 17' pivotably mounted so it can be positioned from the body frame 15 intermediate the ramp 17, 17' to help support the track ramp 17, 17' in a ramp horizontal position but by slightly raising the ramp 17, 17' to release the ramp support brace 65, 65', the support brace can also be swung away from the ramp 17, 17' so the ramp can be lowered to the ground.

To enable the trailer unit 10 to be lowered to the ground on its support legs so the unit 10 can accommodate a vehicle too long to fit on the tracks 16, 16', the unit wheels 18 must be displaced from their normal position during trailering. Therefore, the wheels 18 are rotatably mounted to axle frame 40 which is slidably attached to the body frame 15. In the preferred embodiment, the trailer unit 10 is provided with 2 wheels per side, all attached to the slidable axle frame 40.

Typically with the wheels 18 unloaded, that is, the trailer unit 10 is mostly supported by the 4 support legs, the wheels 18 on the axle frame 40 can be slidably relocated in the body frame 15 between a rearward travel position 41, for use when the wheels support the unit as for traveling, and a forward storage position 42, for use when the unit body frame 15 is lowered over the wheels 18 to the ground. To facilitate axle frame movement, at least one axle frame hydraulic cylinder 43 is mounted longitudinally between the axle frame 40 and the body frame 15 in the direction of axle frame movement.

The axle frame 40 is slidably mounted to the body frame 15 by means of at least one support bar 44. The support has a top portion 45 resting unattached over a flat surface of the body frame 15 and also has a side portion 46 extending down past the body frame 15 to the axle frame 40 to which it is attached, securing the axle frame 40 below the body frame 15. In the preferred embodiment, the support bar 44 is in a "C" shape with a lower portion 47 between the axle frame 40 and the body frame 15. When more than one "C" shape support bar 44 is employed, the bars are connected with the lower portion extending as a common plate comprising the support bar lower "C" portions of all support bars. A lubric pad 48, such as nylon, is secured to that lower portion under the body frame 15 to facilitate sliding on the body frame 15. When the body frame 15 and trailer unit 10 is supported by the wheels 18, the body frame 15 rests securely on the lubric pad 48 and support bar lower portion 47 which are secured to the top of the axle frame 40. The wheels 18 are held in a designated rearward position 41 by a set pin 49 which passes through the support bars 44 into and through the body frame 15 and retained in position by a cotter key passing through a hole in the end of the pin 49. When the trailer unit 10 is supported by the support legs, the axle frame 40 hangs on the support bars 44 from the body frame 15. With the set pin 49 removed, the axle frame 40 and wheels may be relocated by the support bars 44 sliding on the body frame 15 forward to the storage position 42 in the trailer unit 10 by action of the axle frame 40 hydraulic cylinder 43.

Primary wheel alignment pads 80, 80' are mounted forward in each track 16, 16', respectively, over the front support legs 20, 20'. The front wheels 104 of the motor vehicle 100 on the track 16 are typically positioned on these primary pads 80, 80'. Secondary alignment pads 81, 81' are also provided forward of the tracks 16, 16' on extension braces 82, 82' to accommodate longer-than-normal vehicles. Each alignment pad further comprises an upper horizontal plate 83 rotatably adjustable in the yaw direction and secured over a base plate 84 which is slidably adjustable transversely in the track 16, 16' to accommodate various motor vehicle wheel locations. Thus, in the procedure to align a motor vehicle's wheels, the base plate 84 is located transversely in each track 16 to match a motor vehicle's wheel track, and the vehicle 100 is parked on the track 16 with its wheels on an alignment pad. Each vehicle forward wheel is then properly aligned, rotating with the alignment pad upper horizontal plate 83 in the process.

A transverse beam 85 to which ancillary axle-bending apparatus may be attached is also provided, mounted integral to the body frame transversely between the tracks 16, 16' and supported in a body frame cavity 86 on a cavity shelf 87 below the primary alignment pads 80, 80', resting on the body frame cavity shelf 86. The beam 85 is secured to the body frame 15 when not in use by a strap 88.

A hoist 90, such as is commercially manufactured by FMC, is also provided, also mounted transversely on the body frame 15 between the tracks 16, 16'. The hoist 90 has a front roller, 91, 91' and a rear support roller 92, 92' on each side. A rail 14 on which the hoist rollers roll is secured to and extends the length of the tracks 16, 16' so the hoist 90 can be rolled on the rail 14 to any longitudinal position along the track 16 and under the motor vehicle 100. On command, the hoist 90 rises to lift the motor vehicle 100 from the tracks 16, 16' to facilitate servicing of the vehicle 100, for example, in the normal procedure of vehicle wheel and axle bending.

The hoist 90 comprises a pneumatic bladder 93 that extends vertically under air pressure, lifting a hoist upper plate 94. An air compressor may be provided with the unit 10 or accessed externally to the unit, which is the preferred embodiment. Scissor braces 95 are provided forward and aft of the bladder 93, interconnected by cross braces 96 on each side, extending from the bottom of the hoist to the hoist upper plate 94 to prevent tilting of the bladder 93. A piston 97 inside the bladder 93 gives stability to the bladder as it inflates. On each side of the upper plate 94 are extension bars 70, 70' which slidably extend from the upper plate in a upper plate groove 71. On the distal end of each extension bar and also in the upper plate are holes 72 and 72'. One or more hoist pads 73 each having a pad bar extending downward therefrom may be placed in one or more holes 72 for interfacing the hoist 90 to a motor vehicle 100. It is usual practice when raising a vehicle from its axle to place hoist pads in the extension bars extended near the ends of axle. When it is preferred to raise the vehicle from its center, one or more hoist pads 73 are placed in the upper plate holes 72.

A gyro leveling sensor 75 mounted between and below the level of the track 16, 16' is provided central to the unit 10, with data transmitted to an assembly of display lights which indicate a high portion of the unit 10. The unit may be leveled by initiating hydraulic pressure or release of pressure to one of the leg support hydraulic cylinders.

Having described the invention, what is claimed is:

1. A mobile motor vehicle service unit with a body frame having a top, ground-engaging wheels on an axle frame attached under the body frame, a tongue frame attached to the body frame and having hitching means for hitching the tongue frame to a pulling vehicle, the improvement comprising:

a left and a right track immovably fixed integral to the body frame at the frame top on which a motor vehicle may be driven, retractable support legs mounted to the body frame and disposed to engage the ground when extended and adapted to lift and lower the entire service unit, including the entire body frame, tracks, and wheels, from the ground, the retractable support legs including two forward support legs and two rearward support legs with a forward leg and a rearward leg positioned on respective left and right sides of the service unit, such that a vehicle thereon is serviceable from under said vehicle thereon while the weight of the vehicle remains on the lifted unit, a left and a right ramp pivotably mounted to the body frame for loading the motor vehicle on the respective tracks comprising a rearward portion of each left and right track, respectively, and means to lower each ramp to engagement with the ground and to raise each ramp.

2. The invention of claim 1 wherein the forward support legs are mounted longitudinally under the body frame and under the left and right tracks, respectively, under the normal position on the tracks at which front tires of the motor vehicle are typically parked.

3. The invention of claim 1 wherein the rear support legs are mounted longitudinally under the body frame and under said left and right tracks, respectively, over which rear wheels of a motor vehicle may be parked on the tracks.

4. The invention of claim 1 wherein the means to raise and lower each ramp comprises a track ramp hydraulic cylinder pivotably attached between the body frame and intermediate the ramp.

5. The invention of claim 1 further comprising
a rear track support brace pivotably mounted between the body frame and each ramp, releasable at each ramp, to add support to each ramp.

6. The invention of claim 1 comprising
at a position at which front tires of a motor vehicle are parked forward on the tracks a wheel alignment pad on each track which includes an upper horizontal plate rotatably adjustable in the yaw direction and a slidable base plate adjustable transversely in the track over which the upper horizontal plate is rotatably secured to accommodate various motor vehicle wheel locations.

7. The invention of claim 6 further comprising a secondary alignment pad forward of the track on extension braces to accommodate longer-than-normal vehicles.

8. A mobile motor vehicle service unit with a body frame having a top, ground-engaging wheels on an axle frame attached under the body frame, a tongue frame attached to the body frame and having hitching means for hitching the tongue frame to a pulling vehicle, the improvement comprising:

a left and a right track immovably fixed integral to the body frame at the frame top on which a motor vehicle may be driven, retractable support legs mounted to the body frame and disposed to engage the ground when extended and adapted to lift and lower the entire service unit, including the entire body frame, tracks, and wheels, from the ground, the retractable support legs including two forward support legs and two rearward support legs with a forward leg and a rearward leg positioned on respective left and right sides of the service unit, such that a vehicle thereon is serviceable from under said vehicle thereon while the weight of the vehicle remains on the lifted unit, a left and a right ramp pivotably mounted to the body frame for loading the motor vehicle on the respective tracks comprising a rearward portion of each left and right track, respectively, and means to lower each ramp to engagement with the ground and to raise each ramp, wherein the respective support legs are pivotably mounted with a first end connected to respective support leg pivoting mounts on the body frame, and with an unconnected distal end, and means for pivoting the support legs away from and drawing them to the body frame.

9. The invention of claim 8 wherein the means for pivoting said support legs away from and drawing it to the body frame comprises a support leg hydraulic cylinder pivotably mounted between a respective leg and the body frame intermediate the length of the leg and, for a forward support leg, forward of the forward support leg pivoting mount to the body frame for connection to the forward support leg and, for a rearward support leg, rearward of the rearward support leg pivoting mount to the body frame for connection to the rearward support leg.

10. The invention of claim 9 further comprising
wherein the means to raise and lower each ramp comprises a track ramp hydraulic cylinder pivotably attached between the body frame and intermediate the ramp, a mounting means for the rearward support cylinder and the track ramp hydraulic cylinder whereby the rearward support leg hydraulic cylinder and the track ramp hydraulic cylinder are pivotably mounted to the body frame adjacent to one another thereby cooperating in positioning each ramp from the ground to a horizontal position while focusing a motor vehicle load from the track ramp cylinder to the rearward leg cylinder at the same frame position to minimize body frame torque stress.

11. The invention of claim 8 further comprising a foot pivotably mounted on the distal end of each forward support leg to maintain full contact with the ground at all positions of the leg.

12. The invention of claim 8 further comprising
a support axle, with first and second axle ends, mounted on the distal end of transversely opposing support legs to which is attached the means for pivoting the support legs away from and drawing them to the body frame, two wheels in engagement with the ground and rotatably attached respectively to each end of the axle in normal wheel-and-axle fashion such that the legs can relocate by rolling on the wheels when the leg is lifted and lowered.

13. A mobile motor vehicle service unit with a body frame having a top, ground-engaging wheels on an axle frame attached under the body frame, a left and a right track on the body frame top on which a motor vehicle may be driven having a normal position on the track at which front tires of a motor vehicle are typically parked, a tongue frame attached to the body frame and having hitching means for hitching the tongue frame to a pulling vehicle, the improvement comprising:

retractable support legs mounted under the body frame for raising and lowering the unit, including both a forward and a rearward leg positioned on respective left and right sides of the service unit, a left and a right ramp pivotably mounted to the body frame for loading the motor vehicle on the respective tracks comprising a rearward portion of each left and right track, respectively, and means to lower each ramp to engagement with the ground and to raise each ramp, and means for slidably mounting the axle frame to the body frame such that the said ground-engaging wheels are relocatable to a wheel storage area in the body frame so the body frame can be lowered on the support legs over the said ground-engaging wheels and to the ground.

14. A mobile motor vehicle service unit with a body frame having a top, ground-engaging wheels on an axle frame attached under the body frame, a left and a right track on the body frame top on which a motor vehicle may be driven having a normal position on the track at which front tires of a motor vehicle are typically parked, a tongue frame attached to the body frame and having hitching means for hitching the tongue frame to a pulling vehicle, the improvement comprising:

retractable support legs mounted under the body frame for raising and lowering the unit, including two forward support legs and two rearward support legs with a forward leg and a rearward leg on each side of the unit, respectively, a left and a right ramp pivotably mounted to the body frame for loading a motor vehicle on the respective tracks comprising a rearward portion of each left and right track, respectively, and means to lower each ramp to engagement with the ground and to raise each ramp, and means for slidably mounting the axle frame to the body frame such that the said ground-engaging wheels are relocatable to a wheel storage area in the body frame so the body frame can be lowered on the support legs over the said ground-engaging wheels and to the ground.

15. The invention of claim 14 further comprising an axle frame hydraulic cylinder mounted between the body frame and the axle frame for facilitating movement of the axle frame along the body frame.

16. The invention of claim 14 wherein the means for slidably mounting the wheel axle frame under the body frame further comprises a support bar having a top element slidably resting unattached over the unit body frame, a support bar side element extending from the top element down past the body frame to the wheel axle frame to which it is attached, securing the axle frame below the body frame by the axle frame hanging on the body frame by the support bar when the unit is supported by its support legs and by the body frame resting on the wheel axle frame when the unit is support by unit wheels.

17. The invention of claim 16 further comprising said support bar in a "C" shape in which its lower portion is between the axle frame and the body frame.

18. The invention of claim 16 further comprising a lubric pad secured between the body frame and the axle frame to facilitate sliding on the body frame.

19. The invention of claim 14 further comprising a hoist, with first and second sides, relocatably mounted transversely on the body frame between the tracks, a front and a rear support roller on each side of the hoist, a rail secured to and extending the length of the tracks on which the hoist rollers roll so the hoist can be rolled on the rail to any longitudinal position along the track.

20. The invention of claim 14 further comprising a body frame having a body frame cavity with a shelf under each track, and an axle bender beam to which ancillary axle-bending apparatus may be attached mounted transversely between the tracks and supported in the body frame cavity on the cavity shelves below the primary alignment pads.

21. The invention of claim 14 further comprising a sensor mounted to the unit for determining if the unit is level.

22. A mobile motor vehicle service unit with a body frame having a top, ground-engaging wheels on an axle frame attached under the body frame, a left and a right track on the body frame top on which a motor vehicle may be driven, a tongue frame attached to the body frame and having hitching means for hitching the tongue frame to a pulling vehicle, the improvement comprising:

retractable support legs mounted to the body frame and disposed to engage the ground when extended and adapted to lift and lower for raising and lowering the entire service unit, including the body frame, to the ground, the retractable support legs including both a forward and a rearward leg positioned on respective left and right sides of the service unit, a left and a right ramp pivotably mounted to the body frame for loading a motor vehicle on the respective tracks comprising a rearward portion of each left and right track, respectively, and means to lower each ramp to engagement with the ground and to raise each ramp.

* * * * *